United States Patent [19]
Skoog et al.

[11] Patent Number: 6,007,919
[45] Date of Patent: Dec. 28, 1999

[54] HIGH TEMPERATURE HIGH BAND HEAT REFLECTING COATING MATERIAL AND COATED ARTICLE

[75] Inventors: Andrew J. Skoog, West Chester; Jane A. Murphy, Middletown, both of Ohio

[73] Assignee: General Electric Company, Cincinnati, Ohio

[21] Appl. No.: 09/218,627

[22] Filed: Dec. 22, 1998

[51] Int. Cl.$^6$ .................................................. B32B 9/00
[52] U.S. Cl. ........................ 428/469; 428/472; 428/701; 428/702; 106/286.2; 106/286.6; 106/287.18; 106/287.19; 106/287.29
[58] Field of Search .................... 428/469, 472, 428/701, 702, 325; 501/134; 106/14.12, 286.2, 286.6, 287.18, 287.19, 287.29

[56] References Cited

U.S. PATENT DOCUMENTS

| | | | |
|---|---|---|---|
| 3,337,358 | 8/1967 | Vossen | 106/292 |
| 3,397,080 | 8/1968 | Girard et al. | 117/129 |
| 3,576,656 | 4/1971 | Webb et al. | 106/296 |
| 3,607,338 | 9/1971 | Webb et al. | 106/292 |
| 3,793,055 | 2/1974 | Shodai et al. | 117/47 R |
| 4,039,347 | 8/1977 | Fletcher et al. | 106/292 |
| 4,173,485 | 11/1979 | Woditsch et al. | 106/73.3 |
| 4,381,333 | 4/1983 | Stewart et al. | 428/312.6 |
| 5,296,285 | 3/1994 | Babel et al. | 428/213 |
| 5,310,422 | 5/1994 | Abdel-Latiff | 106/635 |

*Primary Examiner*—Timothy M. Speer
*Assistant Examiner*—Bryant Young
*Attorney, Agent, or Firm*—Andrew C. Hess; David L. Narciso

[57] ABSTRACT

A sprayable, non-metallic heat reflecting coating mixture for reflecting heat energy in the frequency range of up to about 5 microns comprises a high temperature zinc compound and a binder substantially transparent to heat energy in the frequency range of up to about 5 microns, in the substantial absence of silica and silica compounds. The mixture and a resulting coating on an article has the capability to reflect an average of at least about 65–85% of heat energy in that frequency range, and stability at temperatures up to about 2000° F. A coating resulting from application of the coating mixture to an article surface has a thickness of greater than about 1 mil up to less than about 10 mils.

12 Claims, 1 Drawing Sheet

HIGH TEMPERATURE HIGH BAND HEAT REFLECTING COATING MATERIAL AND COATED ARTICLE

BACKGROUND OF THE INVENTION

This invention relates to high temperature sprayable, non-metallic heat reflecting coatings and, more particularly, to a heat reflecting coating and coating mixture for reflecting heat energy in the frequency range of up to about 5 microns.

Good heat reflection is desirable from metal or ceramic type article substrates intended to experience high temperatures. One example of such an article is a component used in furnaces for melting glass or metals. Another example is an article used in certain power generating apparatus such as gas turbine engines which include components, made from a high temperature superalloy for example based on Ni or Co or both, operating at temperatures of up to 2000° F. or more. One type of such a component includes the relatively large parts of the exhaust system in the hot operating aft section of an engine.

To protect such an article or component from the extreme high temperature environment experienced during engine operation, it had been a practice to include on the component outer surface an environmental resistant coating such as of a metal base or a ceramic base or their combination. One commonly used coating is a ceramic type thermal barrier coating (TBC). Generally the TBC is in a TBC system including a bond coat between the outer TBC and the underlying substrate. A commonly used type of TBC outer layer is a coating based on zirconia stabilized with yttria, for example about 93 wt. % zirconia stabilized with about 7 wt. % yttria. This general type of TBC has been reported in such U.S. Pat. No. 4,055,705—Stecura et al. (patented Oct. 25, 1977); U.S. Pat. No. 4,328,285—Siemers et al. (patented May 4, 1982); and U.S. Pat. No. 5,236,745—Gupta et al. (patented Aug. 17, 1993).

Although TBC coatings and systems work well as insulating layers for certain applications, alone they do not reflect from a surface significant energy in the high frequency band infrared (IR) range of about 2.6–5 microns. In addition, they are semi-transparent to such energy and have a relatively rough surface for certain applications in which a smooth surface is desired, for example in a fluid flow path or where a thin film type heat reflective overcoating is to be applied.

Many coatings have been reported for use in reflecting heat energy in the lower ultraviolet (UV) frequency range of up to about 2 microns. Some of such coatings, as they relate to the present invention, include coating pigments which include zinc compounds, such as the oxides or the titanates, in a mixture with a binder having silica, a silica compound, or a silicone which can form a silica compound, to resist degradation and/or chalking of the coating on exposure to such UV energy and/or elevated temperatures. For example such U.S. Pat. No. 3,337,358—Vossen (patented Aug. 22, 1967); U.S. Pat. No. 3,576,656—Webb et al. (patented Apr. 27, 1971); U.S. Pat. No. 3,607,338—Webb et al. (patented Sep. 21, 1971); U.S. Pat. No. 3,793,055—Shodai et al. (patented Feb. 19, 1974); and U.S. Pat. No. 4,039,347—Fletcher et al. (patented Aug. 2, 1977) each includes a binder including silica, a silica compound or a silicone for use in a coating, for example to reflect heat energy in the UV band range. However, it has been recognized in evaluations relating to the present invention that the presence in a coating, intended to reflect heat energy in the IR frequency range of about 2.6–5 microns, of silica or a silica compound or a material such as a silicone which will form silica or a silica compound upon exposure to elevated temperatures in air, will cut off heat reflectance at about 4 microns.

BRIEF SUMMARY OF THE INVENTION

The present invention, in one form, provides a sprayable, non-metallic heat reflecting coating mixture for reflecting heat energy in the frequency range of up to about 5 microns. The mixture comprises a powdered high temperature zinc compound in the range of about 5–75 wt. %, and a binder substantially transparent to heat energy in the frequency range of up to about 5 microns, in the substantial absence of silica and silica compounds. The mixture, which is stable at temperatures up to about 2000° F., has the capability to reflect an average of at least about 65–85% heat energy in the frequency range of up to about 5 microns. In another form, the present invention provides an article including a high temperature coating of such a mixture, in a thickness of greater than 1 mil up to about 10 mils.

BRIEF DESCRIPTION OF THE DRAWING

The drawing is a graph comparing the average amount of hemispherical reflectance with frequency range at a variety of energy incidence angles and after different heat treatments.

DETALED DESCRIPTION OF THE INVENTION

Figure 1:
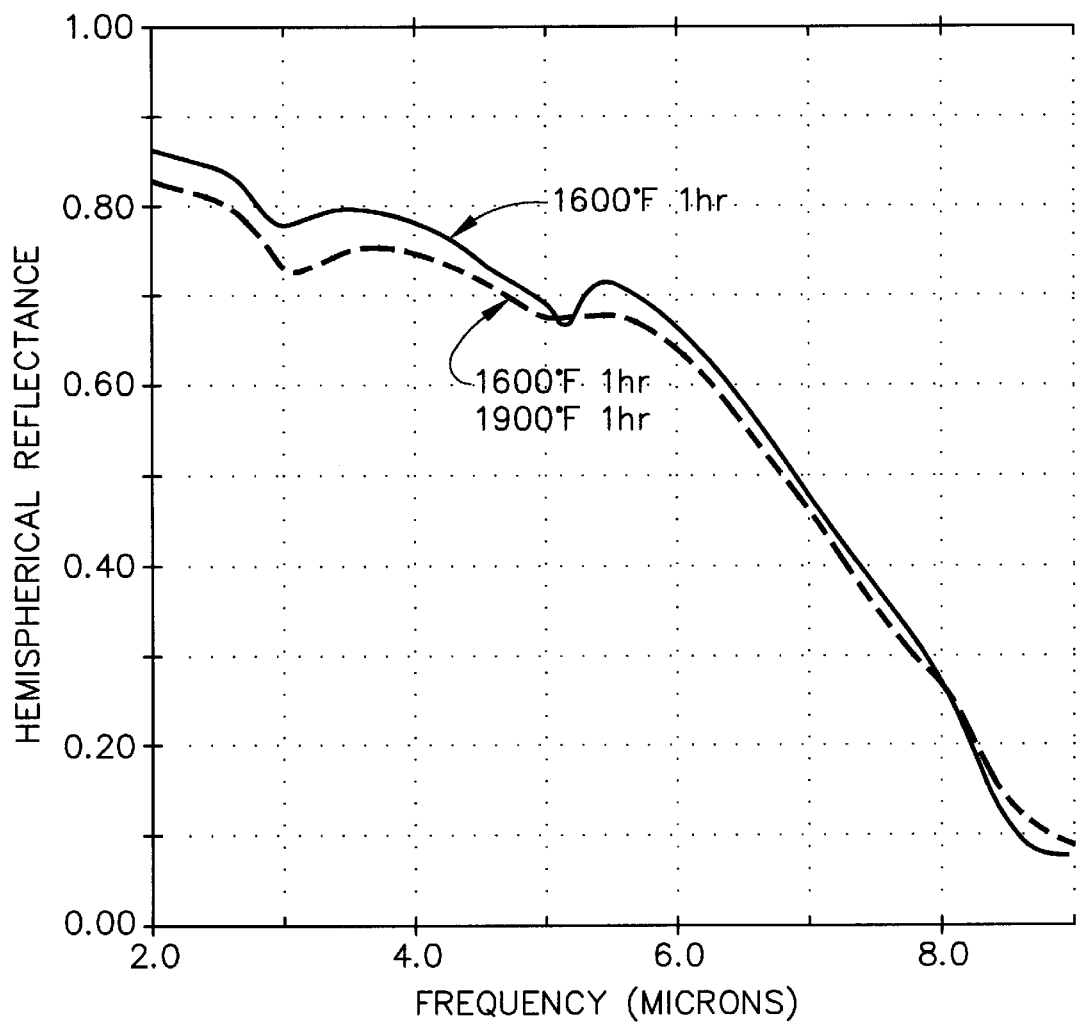

The above described ceramic type TBC substantially does not reflect heat energy in the desired IR frequency range and is undesirably rough for certain applications. In addition, it has been observed that coatings based on aluminum oxides have only moderate heat reflecting performance in that range, for example an average of less than about 45%. Furthermore, in the art it is well known and reported that materials and their coatings which include silica or a silica compound cause cut off in heat reflecting ability at a frequency of about 4 microns.

The present invention provides a coating mixture and a coating which reflects an average of at least about 65–85% of heat energy in the frequency range of up to about 5 microns. Such reflecting capability results from a mixture including a powdered zinc compound, preferably a zinc titanate, in the range of about 5–75 wt. %, along with a binder substantially transparent to heat energy in the frequency range of up to about 5 microns, in the substantial absence of silica and silica compounds to avoid cut off of the ability to reflect heat energy at about 4 microns. As used herein, the terms silica and silica compounds are intended to include compounds, for example a silicone, which can form silica or a compound including silica, after exposure to an elevated temperature in air. If the mixture is in liquid form, for example to enable paint type application, a solvent can be included. In addition, the resultant coating on an article has stability at temperatures up to about 2000° F. In one preferred form, the mixture comprises, by weight, about 5–75% zinc orthotitanate ($Zn_2TiO_4$) with about 0.5–45% phosphate binder. For applying a paint type coating, the material can include up to about 80% water as a solvent. In a preferred form for applying a coating by a thermal or flame spray type method, the mixture comprises a powder of zinc orthotitanate in a mixture with a powder of an oxide of phosphorus, for example $P_2O_5$.

In one evaluation associated with the present invention, no binder was included with the zinc orthotitanate. The resultant coating was found to be very weak using the zinc compound alone. Therefore, the present invention comprises the combination of the zinc compound with a binder substantially transparent to heat energy in the frequency range of about 2.6–5 microns.

During one specific series of evaluations of the present invention, 32.3 wt % powdered zinc orthotitanate, in a preferred range of about 30–35 wt. %, was mixed with 3.2 wt %, in a preferred range of about 3–4 wt. %, of a phosphate binder commercially available from Chemische Fabrik Budenheim as Fabutit 716 material, and the balance water as a solvent for the binder, to provide the desired mixture for applying as a spray paint. The mixture was applied by spray painting to thicknesses in the range of about 1–10 mils onto the outer surface of the above described TBC system surface which was bonded with a high temperature Ni base superalloy article substrate. The coating was allowed to dry overnight. The dried coating was then fired in air at about 1650° F. for about 2 hours. The coating resulting from this series of evaluations had a fired thickness in the range of about 2–6 mils. It was tightly adherent to the underlying TBC system surface and had a surface finish of less than about 200 Ra. Testing of the resultant coating showed an average reflectance of about 65–85% of heat energy in the range of up to about 5.0 microns. The drawing represents a summary and average of such testing.

With reference to the data included in the drawing, article test specimens of a Ni base alloy commercially available as INCO 625 material had the above described TBC system bonded to its surface. Then the coating described above in connection with the specific series of evaluations was fired on the TBC outer surface to a thickness in the range of about 2–6 mils. One group of specimens was heat treated for one hour at 1650° F.; another group was heat treated for one hour at 1650° F. and then for one hour at 1900° F. prior to testing. The testing included directing infrared heat energy at the coated surfaces of the specimens at incidence angles of 10, 30, 50 and 70 degrees and measuring the amount of reflectance in each example. The curves in the drawing are an average of such testing at such incidence angles for such heat treatment conditions. The data of the drawing shows an average of at least about 65–85% hemispherical reflectance in a frequency range of about 2–5 microns. In the hemispherical reflectance test, a specimen is placed within a gold coated sphere which includes a port for incoming waves and a port with a detector for making measurements.

During evaluation of the fired coating, it was recognized that a coating of a thickness less than about 1 mil was insufficient to reflect heat energy in the frequency range of up to about 5 microns, and that such a coating at about 10 mils tended to spall from the surface. Therefore, the coating form of the present invention has a thickness in the range of greater than about 1 mil up to less than about 10 mils, with a preferred thickness in the range of about 2–6 mils.

The present invention provides a coating mixture, as well as a resulting coating on an article stable for use at high temperatures, for example in the range of about 800–2000° F. The coating reflects an average of about 65–85% of heat energy in the frequency range of up to about 5 microns, and particularly in the infrared frequency range of interest to many of about 2.6–5 microns, through the use of a high temperature zinc compound in the substantial absence of silica and silica compounds. Such a coating can be applied in a combination with other coatings, for example over a TBC as in the above examples, before application of an outer coating or a combination of both. The coating and mixture have been evaluated with a combination of zinc orthotitanate and alumina, and can include other high temperature materials, such as oxides of Ti and Mg, to improve coating erosion resistance and/or provide an improved match between the thermal expansion characteristics of the coating and the underlying material or substrate.

Although the present invention has been described in connection with specific examples, embodiments, materials, etc., it should be understood they are intended to be representative of rather than in any way limiting on its scope. Those skilled in the various arts involved will understand that the invention is capable of variations and modifications without departing from the scope of the appended claims.

We claim:

1. A heat reflecting non-metallic mixture for reflecting heat energy in the frequency range of up to about 5 microns, comprising:

a powdered high temperature zinc compound in the range of about 5–75 wt. %; and, a binder substantially transparent to heat energy in the frequency range of up to about 5 microns;

the mixture:
 a) being in the substantial absence of silica and silica compounds;
 b) having the capability to reflect an average of at least about 65–85% of heat energy in the frequency range of up to about 5 microns; and,
 c) having stability at temperatures up to about 2000° F.

2. The mixture of claim 1 in which:

the zinc compound is a zinc titanate; and, the binder is a compound of phosphorus.

3. The mixture of claim 2 in which:

the zinc compound is zinc orthotitanate; and, the binder is a phosphate at about 0.5–45 wt % of the mixture.

4. The mixture of claim 3 in which the mixture includes about 1–80 wt. % water.

5. The mixture of claim 3 in which the binder is a powder of an oxide of phosphorus.

6. The mixture of claim 4 comprising, by weight:

about 30–35% zinc orthotitanate;

about 3–4% phosphate binder; and, the balance water.

7. An article including a heat reflecting non-metallic coating for reflecting from a substrate of the article heat energy in the range of up to about 5 microns, comprising:

a coating of the mixture of claim 1;

the coating having a coating thickness of greater than about 1 mil up to less than about 10 mils.

8. The article of claim 7 in which the coating thickness is in the range of about 2–6 mils.

9. The article of claim 8 comprising:

a substrate of a high temperature superalloy;

an environmental resistant coating on the substrate; and, the heat reflecting coating is applied over the environmental resistant coating.

10. The article of claim 9 in which:

the environmental coating includes an outer TBC; and, the heat reflecting coating is applied over the TBC.

11. The article of claim 10 in which an additional coating is applied over the heat reflecting coating.

12. The article of claim 8 comprising:

a substrate of a high temperature superalloy; and the heat reflecting coating is applied directly over the substrate.

* * * * *